United States Patent
Marini et al.

(12)

(10) Patent No.: US 7,282,253 B2
(45) Date of Patent: Oct. 16, 2007

(54) HIGH-DURABILITY NON-WOVEN FABRIC WITH MELANGE APPEARANCE AND METHOD FOR MANUFACTURE

(76) Inventors: Silvia Marini, Via Aldo Moro, 32, IT-01100 Nepi Viterbo (IT); Omar Teofrasti, Via Strada Dei Poggi, 3, IT-05020 Sismano-Avigliano Umbro (Terni) (IT)

( * ) Notice: Subject to any disclaimer, the term of this patent is extended or adjusted under 35 U.S.C. 154(b) by 80 days.

(21) Appl. No.: 10/743,566

(22) Filed: Dec. 19, 2003

(65) Prior Publication Data
US 2005/0136228 A1 Jun. 23, 2005

(30) Foreign Application Priority Data
Dec. 19, 2002 (IT) ........................... MI2002A2685

(51) Int. Cl.
*B32B 5/02* (2006.01)

(52) U.S. Cl. .................... 428/195.1; 442/153; 442/164; 442/341; 442/345; 442/152; 428/904; 524/840; 28/107

(58) Field of Classification Search ................ 428/904; 442/341, 345, 152, 153, 164; 524/840; 28/107
See application file for complete search history.

(56) References Cited

U.S. PATENT DOCUMENTS

| 3,531,368 A | | 9/1970 | Okamoto et al. | |
| 3,889,292 A | | 6/1975 | Bocek | |
| 3,920,588 A | * | 11/1975 | Traubel et al. ................. 521/64 |
| 4,525,169 A | * | 6/1985 | Higuchi et al. ................. 8/485 |
| 5,798,165 A | * | 8/1998 | Mizoguchi et al. ......... 428/160 |
| 2003/0151154 A1 | * | 8/2003 | Bellucci et al. ................ 264/41 |

FOREIGN PATENT DOCUMENTS

| IT | 823055 | 9/1968 |
| IT | 839921 | 3/1969 |
| IT | 858373 | 2/1970 |
| IT | 873699 | 10/1970 |
| IT | 905222 | 2/1972 |
| IT | 921871 | 6/1972 |

* cited by examiner

*Primary Examiner*—Elizabeth M. Cole
(74) *Attorney, Agent, or Firm*—Pauley Petersen & Erickson

(57) ABSTRACT

A non-woven fabric with melange-type visual appearance and endowed with high-durability comprising a fiber part and a matrix binder characterized by the binder matrix being a polyurethane characterized by the presence of soft segments and rigid segments, the former constituted from mixtures of polycarbonate-polyols and polyester-polyols, and the latter, from urethane groups deriving from the reaction of isocyanates with ureic polyols, and groups deriving from the reaction between the free isocyanate groups and water, and the fiber part comprises a fiber of melange appearance that is a mixture of two or more fibers with different dyeability characteristics.

16 Claims, 1 Drawing Sheet

HIGH-DURABILITY NON-WOVEN FABRIC WITH MELANGE APPEARANCE AND METHOD FOR MANUFACTURE

BACKGROUND OF THE INVENTION

1. Field of the Invention

The present invention relates to a non-woven fabric comprising a fiber part and a matrix binding the same fibers, characterized by a melange-type visual aspect and by high durability; a procedure for the preparation of such non-woven fabric, as well as means suited to that purpose.

The definition "melange aspect" refers to a particular visual effect characterized by an alternation of color and/or intensity obtained by the simultaneous use of one or more of the possibilities listed below:

1. Intimate mixture of differently dyed fibers
 2. The use of a suitable "needle-dyeing" technology that can insert color into the interior of the non-woven fabric
 3. Employment of the print technology considered most suitable for achieving the desired effect (ink-jet, roller, screen, etching, etc.)

The definition "high durability" refers to the high resistance of the material to abrasive agents and to its degradation over time due mainly to absorption of ultraviolet radiation and oxidizing agents.

The high-durability properties are obtained by the use of a polyurethane matrix (binding the fiber elements) characterized not only by its high durability, but also by its ability to be processed at temperatures above those which can be tolerated by polyurethanes usually used for similar purposes.

2. Description of Related Art

Micro-fiber-type non-woven fabrics are known that show a structural organization comprising a high-density fiber surface and a matrix able to bind such micro-fiber structure. The micro-fibers making up these materials are polyester and/or polyamide based, the binder matrix is polyurethane-type (where such term means all the polyurethane-polyurea polymers generally used for this purpose). Products of this type, that have appearance and texture similar to that of natural suede leather, are described for example in Italian Patent Nos. 823055, 839921, 858373, 873669, 905222, 921871 and in U.S. Pat. Nos. 3,531,368 and 3,889,292, all in the name of the present Applicant: such patents are cited here to constitute an integral base for this description for every reference of interest.

Non-woven micro-fiber fabrics of the type described are now produced according to a procedure that can be outlined thus:

1. spinning of a bi-element fiber of the "islands-in-the-sea" type, in which the "island" element comprises polyester or polyamide and the "sea" element comprises a polymer which is immiscible in the island element and can be dissolved in suitable organic or inorganic solvents.
 2. constructing a felt by means of a process of mechanical needle-punching which can interlace between the micro-fibers obtained at point 1.
 3. Impregnating the felt with a binder which holds the "islands" during the "sea" elimination phase. Such a binder is typically an aqueous solution of polyvinyl alcohol (PVA).
 4. Dissolving the "sea" element in a suitable organic (generally trichloroethylene) or inorganic (aqueous acidic or basic solution) solvent or simply warm water.
 5. Impregnating the micro-fiber element in a solution, emulsion or aqueous dispersion of PU in organic solvents (DMF).
 6. Eliminating binder used in point 3 (if binder is not PU).
 7. Dividing the bi-element ("island" element+PU) sheet into two equal parts by means of a cut across the thickness parallel to the surface.
 8. Buffing the surfaces of the product by means of suitable treatment with abrasive papers, to confer the characteristic suede appearance on the structure.
 9. Final dyeing of the product.

The methods used to dye polyester-based non-woven fabric referred to above, provide for dyeing the micro-fiber element by immersing the material in baths containing "dispersed" type coloring agents. It should be emphasized that the use of dispersed coloring alone does not involve dyeing any of the polyurethane matrix, which thus retains its original white or gray color, in as much as this material is not dyeable in a permanent way using this class of coloring. The dyeing process is then followed by a stripping phase, carried out by means of sodium hydrosulphite in NaOH, to remove the excess of coloring present in the material and thus improve the color-fastness characteristics when washed, abraded or exposed to light. The presence of spotting due to the undyed binder matrix sometimes necessitates a second dyeing process capable of dyeing even the polyurethane phase. Such requirement, generally associated with particularly lively and bright colorations, is satisfied by recourse to a second dye bath, downstream of the standard bath described above, in which so-called "pre-metalized" colorants are used capable of dyeing the polyurethane base and thus avoiding the problems related to coloration differences between the micro-fiber and the binder matrix. Such processes enable production of a product surface with a characteristic suede appearance and uniform dye in its micro-fiber element.

Non-woven fabrics with melange appearance are already known, that are produced by using polyurethane matrices that do not give high durability (resistance over time to oxidating agents, U.V. radiation, and hydrolysis of the polymer chains) together with workability at high temperatures (>170° C.) and which necessarily require the sacrifice of at least one of the other desired characteristics in order to confer such porosity characteristics on the end product as to give it a high level of softness.

DESCRIPTION OF PREFERRED EMBODIMENTS

Figure 1:
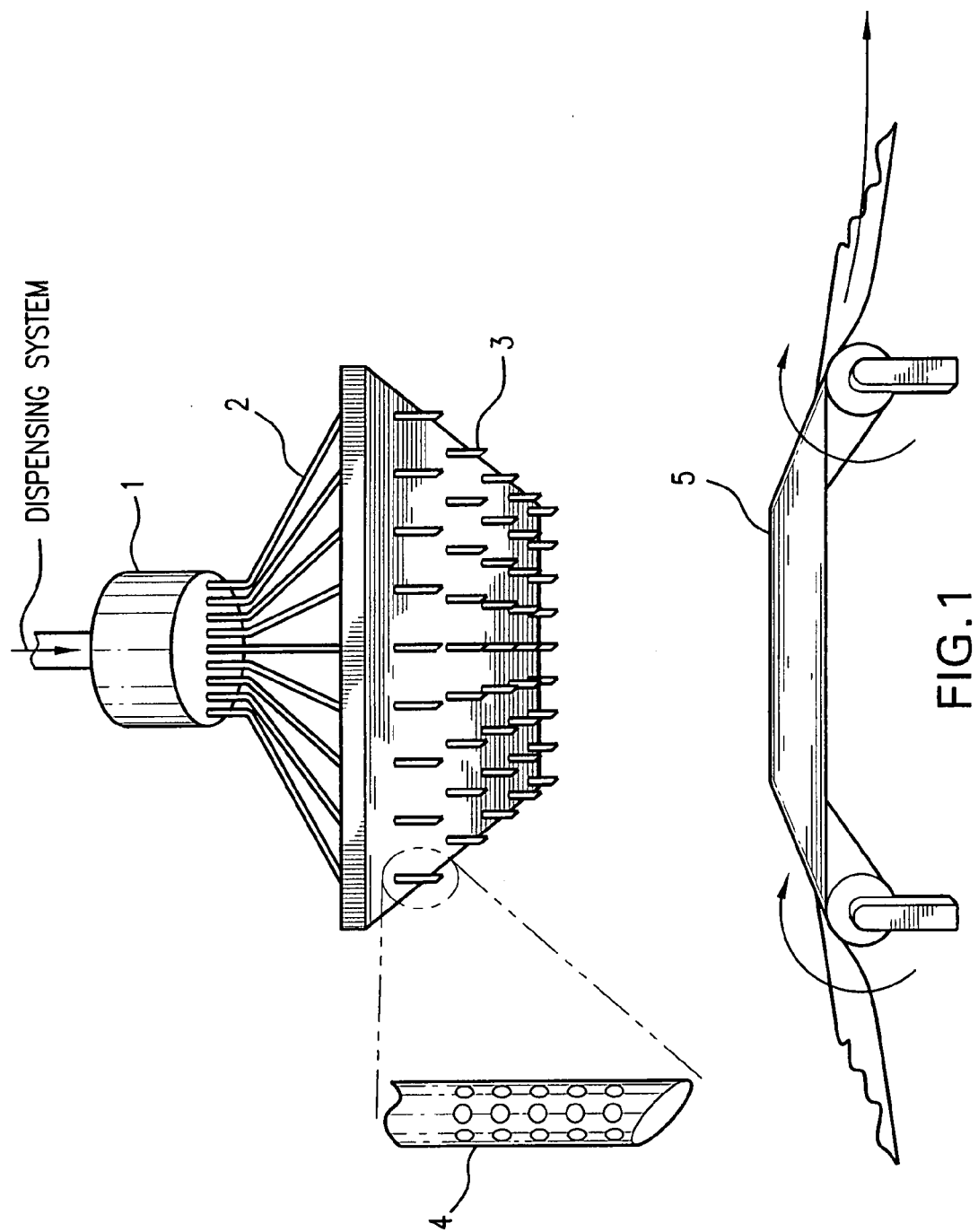
FIG. 1 shows a needle-punching machine according to one preferred embodiment of this invention.

The present invention refers to a non-woven suede fabric endowed with high durability and with melange-type visual appearance according to a combination not present in other synthetic products, known or commercialized to date.

The non-woven fabric object of the present invention comprises a fiber element and a polyurethane characterized by the presence of "soft" segments and "hard" segments; the soft segments constituted by mixtures of polycarbonate polyols and polyester polyols and the hard segments by urethane groups (derived from the reaction of isocyanate with polyols) and ureic groups (derived from the reaction between the free isocyanate groups and water); the fiber element comprises one fiber of melange appearance or two or more fibers with different dyeability characteristics. The characteristic "melange" appearance could previously be obtained by the recourse to three different methods of preparation as stated above.

Where a mixture of at least two different types of fibers is used these must have such physical-chemical properties as to give them different behavior in the dyeing phase. The homogenous mixture of various fibers in the non-woven fabric allows in such cases, coloring to be obtained due to the dyeing with suitable colors, a particular visual effect characterized by alternating colors and/or intensity.

The fibers used in mixtures or taken singularly for the production of the present invention can have weights of 0.001 den and 10 den: the simultaneous use of fibers of "conventional" denier (>1 den) and micro-fibers (<1 den) is thus possible. Among fibers that are can be used are natural fibers (silk, wool, cotton, linen, hemp), cellulose fibers (vicose, acetate) and man-made fibers. In particular, the micro-fibers used in the present invention are produced preferably from polyesters (polyethyleneterephthalate, polyethyleneterephthalate ion, polytrimethyleneterephthalate, polytrimethyleneterephthalate ion, polybutyleneterephthalate, polybutyleneterephthalate ion), but they can be obtained also from polyamides (PA6, PA66) or polyolefines (polyethylene, polypropylene).

Micro-fiber production technology provides for the spinning of multi-component fiber by simultaneous extrusion of one or two polymers (from among those indicated above) with a polymer binding the same micro-fibers that will later be eliminated during succeeding working phases. In the more typical cases such polymer binder comprises polystyrene or a modified polyester (TLAS) or a polymer of the polyhydroxyalcanoates family. The aforesaid binder must however be immiscible with the polymer (or the other polymers) making up the micro-fiber element and must be present in percentages of 10-90% by weight (preferably between 15-50%). The structure of the "microfibre/binder" system is preferably of the "island-sea" type; the total section of the fiber after spinning (sea+islands) is circular and contains within it the circular islands (micro-fibers) in their turn encircled by the sea (binder element) which both hold and separates the same islands.

As an alternative to the technology now described, the fibers after spinning can have hollow, elongated or three-lobe sections. The distribution in section of the two (or three) elements can also be of "radial" type (with the alternated elements "projecting" in a circular section), "skin-core" (with the micro-fiber element encircled by an external crown comprising binder) or the multi-layer (with the two or three components making up parallel and alternating layers).

As far as the dyeing process which can confer the desired melange effect is concerned, the fibers used for the present invention can be dyed with suitable coloring at the end of the production process and/or prior to the formation of the intermediate felt (spinning of synthetic/artificial fiber mass-dyed or use of natural fiber staple already dyed) and/or prior to the production of the intermediate raw felt (in such case, the needle-dyeing technology described hereinafter is preferably used), and/or on the intermediate raw felt (in such case, the needle-dyeing technology and/or a printing technology is preferably used).

In the case of mass-dyed man-made fibers, it should be considered that if the coloring pigments used are insoluble in the polymer, the grain-size of same pigments must be compatible with the dimensions of the micro-fibers produced.

Independently of whether colorless or pre-dyed fibers are used in the mixture or not, at the end of the non-woven fabric production process, one or more of the fibers present can be finally dyed with suitable coloring. The choice of fibers to dye at the end of the production process, the dye technology to use (needle-system or print technology), the coloring to use for this purpose and the number of dye baths required, is made on the basis of the aesthetic result desired.

The high durability characteristics of the product which are one object of the invention are obtained on the other hand as a result of a particular polyurethane matrix.

For such purposes, the parameter "durability of the non-woven fabric" is measured by subjecting the material to aging according to two types of tests:

1. Xenotest 1200", is a U.V. radiation aging carried out in particular equipment (Xenotest 1200 CPS) under well-defined conditions of relative humidity (20±10%), temperature (100±3° C.), irradiation (60 W/m$^2$) and time (138 hours);

2. "Jungle Test", is an aging test to measure the resistance to hydrolysis, and is carried out in a climatic chamber at temperature of 75±1° C., relative humidity of 90±3%, for 5-7-10 weeks.

As far as aging is concerned, the material is analyzed in terms of variation in appearance, resistance to abrasion, variation of the physical-mechanical properties and, limited to the polyurethane matrix, variation of the average molecular weight of the polymer chains.

The polyurethane present in nonwoven fabric according to the present invention is characterized by comprising "hard" segments, comprising urethane groups and ureic groups (deriving from the reaction between free isocyanate groups and water) and "soft" segments, comprising a mixture of polycarbonate-polyols/polyester-polyols, varying in ratio from 80/20 to 20/80.

In particular, the "soft" segments of the polyurethane comprise a mixture of polyols/polycarbonate/polyester, while the "hard" segments comprise ureic groups coming from aromatic diisocyanates and, preferably, deriving from the reaction between 4,4'-diphenylmethane-diisocyanate and water, so as to generate the extender agent directly in the reactor. For the practical production of the present invention, the polycarbonate diols can be chosen from among the polyhexamethylene (preferred), the polypentamethylenecarbonateglycol, and the polyheptamethylenecarbonateglycol, while the polyester polyols can be chosen from among the polyneopentyladipatoglycol (preferred), the polyhexamethyleneadipatoglycol, polytetramethyleneadipatoglycol or the polycarprolactonediol.

The organic diisocyanates used are aromatic, such as 2-4/2-6 toluenediisocyanate, in any 2-4/2-6 isomer ratio (better if the ratio is 80/20), or 4-4' diphenylmethanediisocyanate alone or in a mixture with 2-4 isomer, the ratio by weight between the two of the 0,01 and 50% by weight of 2-4' isomer or which the mixtures of toluendiisocyanate and of diphenylmethanediisocyanate in any ratio between them and their isomers. Solvents can be used are N,N-dimethylformamide, N,N-dimethylacetamide, dimethylsulfoxide, acetone, methylketone, tetrahydrofuran and N-methyl-pyrrolidone.

The non-woven fabric product object of the present invention is prepared according to a procedure that substantially comprises, on the basis of the hypothesis of preparation previously indicated, the following preferred fundamental operations:

producing an intermediate felt by means of mechanical needle-punching, following any necessary mixing in various percentages of at least two types of staple with different dyeing characteristics (in the case of a fiber mixture being used)

producing an intermediate raw felt through impregnating the felt with a polymer matrix;

any necessary dyeing operation;

any necessary finishing processes.

In order to describe the hypothetical preparation previously mentioned more meaningfully, the preparation procedure can be outlined in the following ways:

Hypothesis "A" (Use of Fiber Mixture)

Mixing in varying percentages at least two types of staple with different dyeing characteristics;

Producing an intermediate felt by means of mechanical needle-punching;

Producing an intermediate raw felt through impregnating the felt in the high-durability polyurethane matrix described above;

Any necessary final dyeing of the product;

Any necessary finishing processes.

Hypothesis "B" (Use of a Particular Dye Technology to Needles)

f. use of a single type of staple or mixture in variable percentages at least two types of staple with different dyeing characteristics;

g. Producing an intermediate felt by means of mechanical needle-punching;

h. Producing an intermediate raw felt through the impregnating the felt in the high-durability polyurethane matrix described above and successive dyeing of the semi-finished product with suitable needle-dyeing technology.

i. Any necessary finishing processes.

Hypothesis "C" (Use of the Print Technology Thought Most Suitable)

Proceed as described in Hypotheses A (including in this case also the raw felt obtained using a single type of staple) or as in Hypothesis B with the difference of treating the intermediate raw felt, before and/or after dyeing, with the print technology thought most suitable.

In the production of the intermediate raw felt, impregnation in a second "temporary" binder may also be resorted to if necessary; the binder is then eliminated before obtaining the intermediate raw felt itself.

The type of staple that can be used is in accordance with what was previously described. In addition, using at least one micro-fiber type of staple is preferred, but not indispensable, in the production of the fiber mixture necessary to obtain the melange product (the procedure for producing such micro-fiber follows the indications reported above). Any necessary mixing of the various types of fibers is generally done subsequently to the production of the staple but, where possible, the fibers can be mixed also prior to the cutting of the continuous threads. Each fiber constituent of the mixture can be used in a percentage between 1-99% provided the desired melange effect is obtained.

The production of the intermediate felt follows the homogenous mixing of the types of staple used and is produced by mechanical carding and needle-punching of the fiber mix. The felt thus obtained has a thickness of 2-5 millimeter and a density of 0.1-0.6 g/cm$^3$.

The production of the intermediate raw felt can be achieved with different processes depending on the type of fibers present in the felt and the working hypotheses of job "A" or "B" or "C" described above. By way of example, in order better to illustrate the invention without however limiting its scope, the following cases are detailed:

Hypothesis "A" with at least one type of micro-fiber mixed with conventional fibers (preferred case).

Such situation is characterized by the need to dissolve in the course of preparing the raw felt, the component used to hold and separate the micro-fibers during spinning (polystyrene or modified polyester or a polymer of the family of the polyhydroxyalkanoates in the typical cases indicated at the beginning of the paragraph).

For this reason it is necessary to provide a first phase of impregnating the felt with a second binder which can in its turn hold micro-fibers after the elimination of the binder used during spinning. Typically the second binder used is polyvinyl alcohol or a solution (at a suitable concentration) of the same high-durability polyurethane described previously. Only following this phase is the composite, after drying, treated with the solvent for dissolving the first binder and again dried. Where such binder is polystyrene, chlorinated solvents such as the trieline or the perchloroethylene are suited to the stated purpose; where it is a modified polyester (TLAS) or polyhydroxyalkanoate, the dissolving is carried out in an aqueous acid or basic solution, or in warm water. The intermediate thus obtained is then impregnated in a solution of high-durability polyurethane having the characteristics described extensively previously. Where the second binder previously used comprises the same polyurethane, such second impregnation is simply to optimize the content of PU in the material and maximize the binder action on micro-fibers. The production of the intermediate raw felt continues with the coagulation of the polyurethane in water (at temperatures of 20-50° C.) and with the elimination of the second binder: in the typical case in which such binder is polyvinyl alcohol immersion in water at approximately 80° C. is sufficient to obtain satisfactory dissolving. Drying the composite thus produced gives a laminate that is then subdivided into two parts by cutting in section parallel with the two surfaces (splitting). The preparation of the intermediate raw felt is completed by an emery polishing process using appropriate abrasive papers to partially extract the various types of fiber from the polyurethane matrix (buffing).

Hypothesis "A" with conventional denier fibers only.

This second case it is distinguished from the previous by the absence of micro-fibers and therefore also of the related "sea" element. Such situation simplifies the production of the intermediate raw felt to the point of not requiring either impregnation with a second temporary binder or the solution of binder used in spinning. The process is thus limited to impregnating the felt in a high-durability polyurethane solution, drying it, and the splitting and buffing processes described above.

Hypothesis "B" with at least one type of micro-fiber or with only conventional denier fibers or a mixture of both.

This third case is distinguished from the previous ones by the use of a particular "needle dyeing" technique carried out before the process of splitting or on the intermediate raw felt, as described above. The dye technology in object is characterized by the use of appropriate "needle" machinery which can inject one or more colorants at the same time inside the semi-finished material comprising the fiber element and the high-durability polyurethane matrix. The intermediate raw felt thus produced is therefore already colored according to desired melange effect.

Hypothesis "C": repeats the procedure described for hypothesis "B" with the only difference being that the "needle-dyeing" technique is replaced by the print technology thought most suitable for attaining the desired melange effect.

Final dyeing of the raw felt becomes necessary where the melange effect is obtained by a mixture of fibers and at least one of the these has not already been dyed; or, where the melange effect it is not obtained by the "needle" technique and/or printing (as described in hypotheses "B" and "C" respectively) on substrate comprising single fiber or a previously dyed fiber mixture.

The needle device indicated previously has a completely general value, far beyond the scope for which it is described here in the context of the present patent application.

A further object of the present invention is a needle-punching machine fitted with hollow needles connected to a dispensing system fed by one or more colorants.

A non-limiting illustration of such a machine is shown in FIG. 1, where:
1. manifold connected to a colorant dispensing system which then branches out into several small tubes which distribute individual colors;
2. small-bore tubes connected to the needles;
3. needles equipped with one or more holes;
4. needle detail;
5. table with the product to be dyed.

The final dyeing process of the fibers comprising the product can be carried out even where one or more fibers has already been dyed. Where there are a plurality of fibers to be dyed in the final phase of the production process, the same dyeing can be accomplished by a mixture of the different classes of coloring in an single dye bath or by using successive baths.

The melange non-woven fabric thus obtained can tolerate further work-processes such as being bonded with other substrates, finishing treatments aimed at conferring anti-flame, anti-bacterial, etc. properties. The invention will now be further described with reference to attached examples which are by way of example.

The table shows the abbreviations used in the examples to identify the raw materials.

| ABBREVIATION | RAW MATERIAL |
|---|---|
| PET | Polyethylenetereftalato |
| PET cationic | Polyethylenetereftalato containing ionic groups derived from isophthalic-5-solfonato sodico acid |
| PS | Polystyrene |
| PA6 | Nylon 6 |
| PA66 | Nylon 66 |
| PVA | Polyvinyl alcohol |
| DMF | Dimethylformamide |
| PHC | Polyhexamethylenecarbonateglycol |
| PNA | Polineopentiladipatoglycol |
| MDI | 4-4' Difenilmetanodiisocianato |
| DBA | Dibutylamine |
| PTHF | Polyoxytetramethyleneglycol |
| PPG | Polyoxypropilenglycol |

EXAMPLE 1

PET+PET Cationic with D-PU

A fiber is prepared in staple, comprising micro-fibers of PET (0.13 to 0.15 denier) in a matrix of PS, having:
Denier: 3.8 den
Length: 51 millimeter
Curl: approximately 4-5/cm In particular, the fiber is formed from 57 parts by weight of PET and from 43 parts by weight of PS. If examined in section, the fiber reveals the presence of 16 micro-fibers of PET embedded in the PS matrix. Subsequently, a fiber in staple is prepared from micro-fibers of cationic PET in a a matrix of polystyrene, having the following characteristics:
Denier: 3.8 den
Length: 51 millimeter
Curl: approximately 4-5/cm The fiber it is formed from 57 parts by weight cationic of PET and from 43 parts by weight of PS. If examined in section, the fiber reveals the presence of 16 micro-fibers of PET embedded in the PS matrix.

The two types of staple obtained are mixed homogenously in the most suitable proportions to obtain the melange effect desired. The PET content is usually 85-40%, the content of cationic PET is usually 15-60%. By means of mixing two fibers in staple, a raw felt is prepared which is subjected to needle-punching in order to form a needle-punched felt with a typical density between 0.160-0.220 g/cm$^3$. The needle-punched felt is immersed into a 20% by weight aqueous solution of polyvinyl alcohol and is then dried. The needle-punched felt, thus treated, is successively immersed into trichloroethylene until the polystyrene fiber matrix has completely dissolved, with consequent formation of micro-fiber non-woven fabric of PET mixed with micro-fibers of cationic PET. The non-woven fabric thus formed is then dried, obtaining an intermediate product called D1 felt.

A polyurethane elastomer is prepared separately in the shape of a solution in N,N-dimethyl-formamide. In a first stage (pre-polymerization), PHC and PNA both of molecular weight 2.000, are made to react at a temperature of 65° C. and under agitation, with MDI in an isocyanate/diol molar ratio of 2.9:1. After 3 hours of the reaction, the pre-polymer thus obtained is cooled to a temperature of 45° C. and diluted with DMF having a humidity content of 0,03%, until a 25% pre-polymer solution is obtained with a free NCO content of 1,46%.

Then, maintaining the temperature at 45° C., DBA and water dissolved in DMF are added slowly over a period of 5 minutes to give a polyurethane-polyurea with a calculated molecular weight of 43,000. The temperature is then raised to 65° C., the reactor is maintained under agitation for others 8 hours, giving, at the end, a polyurethane polyurea solution, stable over time, with viscosity at 20° C. of 24,000 mPa*sec. The elastomer solution thus prepared is thus diluted with N,Ndimethylformamide, containing Irganox 1098 and Tinuvin 350 in order to form a 14% by weight solution. By coagulate a film of such solution in water, a polymer with high porosity is obtained.

The D1 felt, prepared as described above, is immersed into the polyurethane elastomer solution and the non-woven fabric thus impregnated is first wrung out by passing through a pair of rollers and subsequently immersed for 1 hour in a bath of water maintained at 40° C. A coagulated sheet is thus obtained that is passed into a bath of water heated to 80° C. in order to extract residual solvent and polyvinyl alcohol. After drying, a composite micro-fiber sheet is obtained that is cut into sheets with thickness generally in the order of 0.9-1.2 millimeter, and sheets thus obtained are subjected to emery polishing for raise the hair: the result is synthetic micro-fiber non-woven fabric called raw felt E1 having thickness typically varying between 0,7-1.0 millimeter.

EXAMPLE 2

Cationic PET+PET with Traditional Lower-Durability PU

This example repeats the process of example no. 1 with the difference that it uses a "traditional" type of polyurethane characterized by inferior performance in terms of durability. In parallel with the felt D2 produced according to the procedure described in the example n° 1, a polyurethane elastomer is prepared by putting PTHF and PPG (both of molecular weight 2000) to react at a temperature of 65° C.

under agitation with isocyanate/diol at a molar ratio of 2.9:1. After 3 hours of the reaction, the pre-polymer thus obtained is cooled to a temperature of 45° C. and diluted with DMF, having a humidity content of 0,03%, until a 25% pre-polymer solution with a free NCO content of 1,46% is obtained. Thus, maintaining the temperature at 45° C., DBA and water dissolved in DMF are added slowly over a period of 5 minutes to give a polyurethane-polyurea of calculated molecular weight of 43,000. The temperature is then raised to 65° C., the reactor is maintained under agitation for another 8 hours, giving, at the end, a polyurethane polyurea solution, stable over time, with viscosity at 20° C. of 25,000 mPa*sec.

The elastomer solution thus prepared is then diluted with N,Ndimethylformamide containing Irganox 1098 and Tinuvin 350 to form a 14% by weight solution. By coagulating a film of such solution in water, a polymer with high porosity is obtained.

The D2 felt is then immersed in the polyurethane solution and worked until the production of the E2 intermediate raw felt according to the same procedure indicated in example N°1.

EXAMPLE 3

Varying Cationic PET+PET with PET/PS=80/20

This example repeats the process of example no. 1 with the difference that micro-fibers are prepared from cationic PET (and/or PET) that are distinguished by being formed from 80 parts by weight of cationic PET and from 20 parts by weight of PS (and/or from 80 parts by weight of PET and from 20 parts by weight of PS). If examined in section, the fiber reveals the presence of 16 micro-fibers of PET embedded in the PS matrix. The production of the non-woven fabric raw felt follows the procedure indicated in the example 1.

EXAMPLE 4

Varying Nylon-6 or Nylon-66 in Place of the Cationic PET

This example repeats the process of examples nos. 1-3 with the difference that it uses PA6 or PA66 in place of the cationic PET, giving an intermediate non-woven fabric called D3 felt. Proceeding always as described in example n° 1, synthetic micro-fiber non-woven fabric called raw felt E3 is subsequently obtained. The variant using traditional polyurethane in place of the high-durability polyurethane, not explicitly contemplated in the present example, involves differences in terms of durability very similar to those existing between intermediate E1 and E2.

EXAMPLE 5

Varying MASS-DYED PET in Place of the Cationic PET

This example repeats the process of examples nos. 1-3 with the difference that it uses mass-dyed PET in place of the cationic PET, giving an intermediate non-woven fabric called D4 felt. The mass-dyed PET can contain coloring soluble in the polymer and/or pigments insoluble in it (of organic and/or inorganic type). Always proceeding as described in example n° 1, a synthetic micro-fiber non-woven fabric called raw felt E4 is subsequently obtained, with a bicolor melange effect of dye-not-dyed type. The variant using traditional polyurethane in place of the high-durability polyurethane, not explicitly contemplated in the present example, involves differences in terms of durability very similar to those existing between intermediate E1 and E2.

EXAMPLE 6

Varying Nylon-6 or Nylon-66 Mass-Dyed in Place of the Cationic PET

This example repeats the process of examples nos. 1-3 with the difference that it uses mass-dyed PA6 or PA66 in place of the cationic PET, giving an intermediate non-woven fabric called D5 felt. Proceeding always as described in example n° 1, a synthetic micro-fiber non-woven fabric called E5 raw felt with a bicolor melange effect of dye-not-dyed type is subsequently obtained.

The variant using traditional polyurethane in place of the high-durability polyurethane, not explicitly contemplated in the present example, involves differences in terms of durability very similar to those existing between intermediate E1 and E2.

EXAMPLE 7

Varying Cationic Mass-Dyed PET in Place of the Cationic PET

This example repeats the process of examples nos. 1-3 with the difference that it uses mass-dyed cationic PET in place of the cationic PET, giving an intermediate non-woven fabric called D6 felt. Proceeding always as described in example n°1, a synthetic micro-fiber not-woven fabric E6 called raw felt with a bicolor melange effect of dye-not-dyed type is subsequently obtained. The variant using traditional polyurethane in place of the high-durability polyurethane, not explicitly contemplated in the present example, involves differences in terms of durability very similar to those existing between intermediate E1 and E2.

EXAMPLE 8

Varying TLAS

The non-woven fabric called felts described as D1, D3, D4, D5, D6, respectively, in examples 1, 4, 5, 6, 7, can also be obtained following the procedure illustrated in the said examples with the difference that they use a fiber whose sea element is a modified polyester (TLAS). If examined in section, the fiber reveals the presence of 16 micro-fibers embedded in the TLAS matrix. A raw felt is prepared from the fiber staple; it is subjected to needle-punching in order to form a needle-punched felt with a density of 0.160-0.220 g/cm$^3$. The needle-punched felt is shrunk in warm water at a temperature of 90° C., immersed in a high-saponification polyvinyl alcohol (H. S. PVA) solution at 12% at a temperature around 70° C. and thermofixed in an oven at 150° C. for 30 minutes. The workpiece impregnated with PVA is immersed into a 10% solution of NaOH at a temperature of 60° C. to dissolve the "sea" element.

EXAMPLE 9

Varying Double Impregnation

The non-woven fabric called felts and described D1, D3, D4, D5, D6, respectively in the examples: 1, 4, 5, 6, 7, can be obtained by following the procedure illustrated in the said examples, with the difference that the needle-punched felt is not immersed directly in an aqueous polyvinyl alcohol solution but in a polyurethane solution at the more suitable concentration. The dried material is subsequently immersed in trichloroethylene until the polystyrene fiber matrix has been completely dissolved, with consequent formation of micro-fiber non-woven fabric of PET mixed with micro-fibers of cationic PET. The non-woven fabric is then dried and a second impregnation in the polyurethane solution is prepared as described in example n° 1. This second impregnation is necessary to maximize binder action of the PU and optimize the content in the non-woven fabric produced. The successive phases of working, necessary to the production of an intermediate raw felt E1, are similar to those described in example n° 1.

EXAMPLE 10

Varying Felt by Mixing in the Rack or Cutter

The non-woven fabric called felts and described D1, D3, D4, D5, D6, D7, respectively, in the examples 1, 4, 5, 6, 7, 8, can also be obtained by mixing the various types of fibers prior to cutting the continuous yarn (formation of the staple) rather than subsequently to it. In such case the cut fibers lead to the formation of a staple already comprising a mixture of fibers.

EXAMPLE 11

PET+Wool Staple prepare a fiber in staple formed from micro-fibers of PET following the procedure described in examples nos. 1-3 or in the examples 8-9.

Said micro-fibers are mixed with wool staple in the ratios thought most suitable to obtaining the final melange effect desired. Proceeding as described in example no. 1, non-woven fabric called D10 felt is obtained and subsequently an intermediate non-woven fabric called E10 raw felt. The variant using traditional polyurethane in place of the high-durability polyurethane, not explicitly contemplated in the present example, involves differences in terms of durability very similar to those existing between intermediate E1 and E2.

EXAMPLE 12

PET+Silk Staple

This example repeats the process described in example no. 11 with the difference that it uses silk staple in place of the wool, giving an intermediate non-woven fabric called D11 felt and non-woven fabric called E11 raw felt.

EXAMPLE 13

PET+Cotton Staple

This example repeats the process of example no. 11 with the difference that it uses cotton staple in place of the wool, giving an intermediate non-woven fabric called D12 felt and subsequently non-woven fabric called E12 raw felt.

EXAMPLE 14

PET+Hemp Staple

This example repeats the process of example no. 11 with the difference that it uses hemp staple in place of the wool, giving an intermediate non-woven fabric called D13 felt and subsequently non-woven fabric called E13 raw felt.

EXAMPLE 15

Viscous PET+Staple of

This example repeats the process of example no. 11 with the difference that it uses staple in place of the wool, giving an intermediate non-woven fabric called D14 felt and subsequently non-woven fabric called E14 raw felt.

EXAMPLE 16

PET+Cellulose Acetate Staple

This example repeats the process of example no. 11 with the difference that it uses of cellulose acetate staple in place of the wool, obtaining intermediate non-woven fabric called D15 felt and subsequently non-woven fabric called E15 raw felt.

EXAMPLE 17

PET+Linen Staple

This example repeats the process of example no. 11 with the difference that it uses linen staple in place of the wool, giving an intermediate non-woven fabric called D16 felt and subsequently non-woven fabric called E16 raw felt.

EXAMPLE 18

Cationic PET/PET Melange Dye—Single Dyeing Cycle the synthetic micro-fiber non-woven fabric called raw felt E1 and E2, obtained respectively according to the procedures described in examples 1-3-8-9-10 and in example 2, is subjected to dyeing in "JET" equipment, fitted with a "Venturi Tube". In particular, the synthetic micro-fiber non-woven fabric raw felts are made to pass through the "Venturi tube" for 1 hour, operating at 125° C. in a single aqueous dye bath containing dispersed coloring Yellow Dianix SE-G and the cationic coloring Blue Astrazon FBL, respectively, in amounts of 2% and 1% by weight of the synthetic non-woven fabric micro-fiber raw felt. At the end of the treatment two prototypes of synthetic suede leather with bicolor melange effect are obtained. The appraisal of the result in terms of durability, carried out in comparison with prototypes obtained with high-durability polyurethane and traditional polyurethane, is produced according to the tests indicated in table I.

EXAMPLE 19

Cationic PET/PET Melange Dye—Double Dyeing Cycle the synthetic micro-fiber non-woven fabric called raw felt E1 and E2, obtained respectively according to the procedures described in examples 1-3-8-9-10 and example 2, is dyed in "JET" equipment, fitted with a "Venturi tube". In particular, the synthetic micro-fiber non-woven fabric raw felt is made to pass through the "Venturi tube" for 1 hour, operating at 125° C. in a aqueous dye bath containing dispersed coloring Yellow Dianix SE-G in an amount of 2% by weight of non-woven fabric micro-fiber the synthetic raw felt. The dyed products thus obtained, are made to pass again through the "Venturi tube" for 1 hour, operating at 100° C. in an aqueous dye bath containing cationic coloring Blue Astrazon FBL in an amount of 1% by weight of the synthetic micro-fiber non-woven fabric raw felt. At the end of the treatment two prototypes of synthetic suede leather with bicolor melange effect are obtained. See table 1 for an appraisal of the durability performance of the products obtained according to the present example. Many such characteristics are similar to those of the non-woven fabric produced in example 18.

EXAMPLE 20

Cationic PET/PET Dye Melange—USE Of Dye-Not-Dyed Cationic Coloring Only

The synthetic micro-fiber non-woven fabric called raw felt E1 and E2, obtained respectively according to the procedures described in examples 1-3-8-9-10 and in example 2, are dyed in "JET" equipment equipped with a "Venturi tube". In particular, the synthetic micro-fiber non-woven fabric raw felts are made to pass through the "Venturi tube" for the 1 hour, operating at 100° C. in an aqueous dye bath containing cationic Blue Astrazon FBL coloring in amounts of 1% by weight of the synthetic micro-fiber non-woven fabric raw felt. At the end of the treatment, two prototypes of synthetic suede leather with a bicolor melange effect of dye-not-dyed type are obtained. An appraisal of the durability performance of the products obtained according to the present example shows in the table how many such characteristics are similar to those of the non-woven fabric produced in example 18.

EXAMPLE 21

Micro PET Dye/Nylon

The synthetic micro-fiber non-woven fabric called raw felt E3 and obtained following procedure described in example 4 or example 8, or example 9, or example 10, is dyed in "JET" equipment as described in example 19 or in example 20 with the only variation being the use of Blue Telon GGL coloring in place of Blue Astrazon FBL coloring.

EXAMPLE 22

Micro PET Dye/with all Dyes in Mass

The synthetic micro-fiber non-woven fabric raw felt called E4, E5, E6 and, respectively, obtained in the examples: 6, 7, 8, or, alternatively, in example 9 or in example 10 are dyed in "JET" equipment fitted with a "Venturi tube". In particular, each synthetic micro-fiber non-woven fabric raw felt, stated above, is made to pass through the "Venturi tube" for 1 hour, operating at 125° C. in an aqueous dye bath containing dispersed coloring Yellow Dianix SE-G in the amount of 2% by weight of the synthetic micro-fiber non-woven fabric raw felt. At the end of the treatment, a synthetic suede leather is obtained with a bicolor melange effect.

EXAMPLE 23

Micro Pet Dye/Wool-Silk Staple

The non-woven fabric raw felt called E10 and E11 and obtained following procedures described, respectively, in examples 11 and 12, are dyed operating in general as described in example 18, or in example 19, or in example 20 but considering that wool and silk, beyond coloring that with cationic dyes, can also be dyed with other classes of coloring such as acids, metalized, direct, reactive, to the dye.

EXAMPLE 24

Micro PET Dye/Cotton, Hemp, Linen, Viscose Staple)

The non-woven fabric raw felt called E12, E13, E14 and E16 and obtained following the procedures described respectively in examples 13, 14, 15 and 17, are dyed operating in general as described in example 18, or in example 19, or in example 20 but considering that cotton, hemp, linen, beyond being dyed with cationic coloring, can also be dyed with other classes of coloring such as direct, reactive, to the dye (water-soluble and not).

EXAMPLE 25

"Needle Dye" System

The semi-finished raw felts of type D and E and other possible intermediate types obtainable in the working steps that allow the passage from one to the other, as described in examples from no. 1 to no. 17 and from no. 21 to no. 24, including also the corresponding intermediate comprising 100% of a single type of fiber, both before or after dyeing, as described in example 18 or 19 or 20, can be dyed by the following treatment called "needle dyeing" in which a dedicated needle-punching machine fitted with hollow needles connected to a dispensing system fed with suitable coloring, deposits the same inside the structure of the product The following heat treatment ensures the fixing of the coloration. In this case a product with melange effect is obtained, which, based on the combinations chosen and in relation to the variety of coloring used to feed the needle system, can be either bicolor or multicolor.

EXAMPLE 26

Print Technologies

Proceed as described in example 25 with the only difference being that the "needle" system is replaced by a print technology, that among those known, allows the desired melange effect to be obtained.

TABLE 1

PROTOTYPE MELANGE

| | RAW FELT E1 after DYE (Es. 18) | RAW FELT E2 after DYE (Es. 19) |
|---|---|---|
| TYPE OF POLYURETHANE USED | | |
| | D-PU (high durability) | Traditional |
| NON-WOVEN FABRIC AFTER AGING | | |
| | Retention of Molecular weight "Mn" in reference to the non-aged value (%) | |
| Xenotest 1200 (1) | 93 | 50 |
| Jungle Test (2) 5 weeks | 85 | 70 |
| Jungle Test (2) 7 weeks | 75 | 65 |
| Jungle Test (2) 10 weeks | 65 | 55 |
| | Aspect after abrasion of 20,000 cycles on Martindale. Load = 12 KPa (Scale 1-5) | 0 |
| Xenotest 1200 (1) | 4 | 1 |
| Jungle Test (2) 5 weeks | 4-5 | 4-5 |
| Jungle Test (2) 7 weeks | 4-5 | 4 |
| Jungle Test (2) 10 weeks | 4 | 2-3 |
| | Retention of Breaking Strain as % of non-aged | |
| Xenotest 1200 (1) | 95 | 60 |
| Jungle Test (2) 5 weeks | 90 | 90 |
| Jungle Test (2) 7 weeks | 90 | 90 |
| Jungle Test (2) 10 weeks | 80 | 80 |

Xenotest 1200 (1)
U.V. aging. T = 100 ± 3° C.; Relative Humidity = 20 ± 10%; Radiation Energy = 60 W/m$^3$; Duration = 138 hours
Jungle Test (2)
Aging in Climate Chamber; T = 75 ± 1° C.; Relative Humidity = 90 ± 3%

Italian Patent Reference M12002A002685, the priority document corresponding to this invention, and its teachings are incorporated, by reference, into this specification.

We claim:

1. A non-woven fabric with a melange appearance and high-durability comprising:
    a fiber part including at least one of a melange appearance fiber and a mixture of at least two fibers with different dyeability characteristics;
    a matrix binder comprising a polyurethane including soft segments and rigid segments, the soft segments consisting of at least one polycarbonate polyol selected from the group consisting of polypentamethylenecarbonatoglycol, polyhexamethylenecarbonatoglycol and polyheptamethylenecarbonatoglycol and at least one polyester polyol selected from the group consisting of polyhexamethyleneadipateglycol, polyneopentyladipateglycol, and polycaprolactonediol, and the rigid segments consisting of urethane groups derived from the reaction of isocyanate with polyols, and ureic groups derived from the reaction between isocyanate groups and water.

2. The non-woven fabric of claim 1 further comprising:
    a felt including at least two fibers with different dyeability characteristics impregnated in the polyurethane.

3. The non-woven fabric of claim 1 wherein the ratio by weight in the mixture between polycarbonate-polyol and polyester polyol is between approximately 80/20 and approximately 20/80.

4. The non-woven fabric of claim 1 wherein the isocyanate groups are selected from the group consisting of 2-4(2-6) toluenediisocyanate, 4-4'-diphenylmethane-diisocyanate, 3-isocyanatemethyl 3-5-5 trimethylacidohexylisocyanate, and mixtures thereof.

5. The non-woven fabric of claim 1 wherein the fiber part includes fibers having a denier from between approximately 0.001 and approximately 10.

6. The non-woven fabric of claim 5 wherein the fibers are selected from the group consisting of natural fibers, cellulose fibers and man-made fibers.

7. The non-woven fabric of claim 5 wherein at least one of the fibers is a micro-fiber.

8. The non-woven fabric of claim 2 wherein the fiber part includes one or more fibers that are dyed prior to formation of the felt.

9. The non-woven fabric of claim 1 wherein the fiber part comprises:
    a fiber whose melange appearance is obtained by injecting one or more colorants into the fiber through the use of a needle-punching machine fitted with hollow needles.

10. The non-woven fabric of claim 1 wherein the fiber part comprises:
    a fiber whose melange appearance is obtained by means of the use of a print technology.

11. A method for preparing the non-woven fabric of claim 1 comprising the following steps:
    mixing at least two types of staples with different dyeing characteristics;
    producing an intermediate felt by mechanical needle-punching;
    producing an intermediate raw felt through impregnating the intermediate felt in the matrix binder; and
    dyeing and finishing a resulting product.

12. The method of claim 11 further comprising the step of:
    impregnating the intermediate raw felt in a second binder; and eliminating the second binder.

13. The method of claim 11 further comprising:
    dyeing a semi-finished product using needle dyeing technologies after impregnating the felt in the matrix binder.

14. The method of claim 13 wherein the dyeing of the semi-finished product is performed using a needle-punching machine fitted with hollow needles connected to a system for dispensing coloring.

15. The method of claim 11 wherein the intermediate raw felt is treated according to a print technology.

16. The method of claim 14 wherein the needle-punching machine is fitted with of a system of hollow needles connected to a dispensing system fed by one or more dye colors.

* * * * *